US009679553B2

(12) United States Patent
Onishi et al.

(10) Patent No.: US 9,679,553 B2
(45) Date of Patent: *Jun. 13, 2017

(54) CONVERSATION-SENTENCE GENERATION DEVICE, CONVERSATION-SENTENCE GENERATION METHOD, AND CONVERSATION-SENTENCE GENERATION PROGRAM

(71) Applicants: NEC CORPORATION, Tokyo (JP); NEC SYSTEM TECHNOLOGIES, LTD., Osaka (JP)

(72) Inventors: Takashi Onishi, Tokyo (JP); Chiho Igi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,572

(22) PCT Filed: Nov. 7, 2013

(86) PCT No.: PCT/JP2013/080139
§ 371 (c)(1),
(2) Date: May 8, 2015

(87) PCT Pub. No.: WO2014/073613
PCT Pub. Date: May 15, 2014

(65) Prior Publication Data
US 2015/0279350 A1 Oct. 1, 2015

(30) Foreign Application Priority Data
Nov. 8, 2012 (JP) .................................. 2012-246262

(51) Int. Cl.
*G10L 13/033* (2013.01)
*G06F 17/28* (2006.01)
*G06F 17/30* (2006.01)

(52) U.S. Cl.
CPC ............ *G10L 13/033* (2013.01); *G06F 17/28* (2013.01); *G06F 17/2881* (2013.01); *G06F 17/30654* (2013.01)

(58) Field of Classification Search
CPC ................. G06F 17/28; G06F 17/2881; G06F 17/30654; G10L 13/033
See application file for complete search history.

(56) References Cited

U.S. PATENT DOCUMENTS 5,367,454 A * 11/1994 Kawamoto ............ G06N 3/004
345/418
6,249,720 B1 * 6/2001 Kubota ............... B60R 16/0232
340/990

FOREIGN PATENT DOCUMENTS

JP 2005-157494 A 6/2005
JP 2006-71936 A 3/2006

OTHER PUBLICATIONS

Mineyasu Sugita, "Transactional Analysis", Nihon Bunka Kagakusya Co., Ltd., 1985, cited in the Specification.
(Continued)

Primary Examiner — Ibrahim Siddo

(57) ABSTRACT

A conversation-sentence generation device according to the invention of this application receives, as input information, a conversation sentence given from a user to an agent, first clue information based on which a physical and psychological state of the agent is estimated, and second clue information based on which a physical and psychological state of the user is estimated, stores the physical and psychological state of the agent as an agent state, stores the physical and psychological state of the user as a user state, estimates a new agent state based on the input information and the agent state, estimates a new user state based on the input information and the user state, generates, based on the input information, the agent state, and the user state, an utterance
(Continued)

intention directed from the agent to the user, and generates and outputs, based on the input information, the agent state, the user state, and the utterance intention, a conversation sentence given from the agent to the user.

9 Claims, 3 Drawing Sheets

(56) References Cited

OTHER PUBLICATIONS

English Translation for Write opinion of PCT/JP2013/080139.
Kazuya Mera et al., "Mood Calculating Method for Speech Interface Agent by using Emotion Generating Calculation Method and Mental State Transition Network", Journal of Japan Society for Fuzzy Theory and Intelligent Informatics, Feb. 15, 2010, vol. 22, No. 1, pp. 10 to 24, cited in ISR.
International Search Report for PCT Application No. PCT/JP2013/080139, mailed on Dec. 24, 2013.

* cited by examiner

CONVERSATION-SENTENCE GENERATION DEVICE, CONVERSATION-SENTENCE GENERATION METHOD, AND CONVERSATION-SENTENCE GENERATION PROGRAM

This application is a National Stage Entry of PCT/JP2013/080139 filed on Nov. 7, 2013, which claims priority from Japanese Patent Application 2012-246262 filed on Nov. 8, 2012, the contents of all of which are incorporated herein by reference, in their entirety.

TECHNICAL FIELD

The present invention relates to a conversation-sentence generation device, a conversation-sentence generation method, and a conversation-sentence generation program, and more particularly to a conversation-sentence generation device, a conversation-sentence generation method, and a conversation-sentence generation program for generating a conversation sentence of a virtual agent having a personified conversation with a user.

BACKGROUND ART

A human has a desire to communicate with somebody, and gain somebody's sympathy. The communication target in this case is not limited to a certain human, but may be all possible types of targets such as a machine and an animal. Up to the present time, various types of dialogue systems have been proposed as systems capable of realizing interaction between a human and a machine.

Patent Literature 1 is an example of such dialogue systems. According to a dialogue system disclosed in PTL 1, which is a system for realizing a smooth dialogue between a human and a machine, an ego-state estimating unit estimates an ego-state through transactional analysis (for example, Mineyasu SUGITA, "Transactional Analysis", Nihon Bunka Kagakusya Co., Ltd., 1985), and a dialogue control unit outputs a response text based on the estimated ego-state.

CITATION LIST

Patent Literature

PTL1: Japanese Laid-open Patent Laid-open No. 2006-71936

SUMMARY OF INVENTION

Technical Problem

However, these conventional dialogue systems are intended to achieve a predetermined task through dialogues between a human and a machine based on a scenario determined beforehand. In this case, most of dialogues generated by the dialogue systems are uniform, and not intended to be given as free conversations such as chatting between humans.

According to the conventional dialogue systems between a human and a machine, the dialogue control unit determines contents of a request issued from a human, and converses with the human based on a dialogue scenario appropriate for the contents of the request to achieve a predetermined task. Most of dialogues generated in this manner are uniform, and generation of a wide variety of conversation sentences such as conversations between humans, and generation of conversation sentences suited for situations of a user have been both difficult. In case of a conversation between humans, various types of utterance are given even for making a remark having the same intention so as not let a conversation partner get tired of the conversation. In addition, utterance suited for a physical and psychological state of the conversation partner is given during the conversation. Furthermore, the conversation is consistent with contents of previous remarks given in the past and remembered. However, it is difficult for the conventional dialogue systems to realize human-like conversations of this level.

The present invention has been developed to solve the aforementioned problems. It is an object of the present invention to provide a conversation-sentence generation device, a conversation-sentence generation method, and a conversation-sentence generation program capable of realizing human-like conversations.

Solution to Problem

The present invention is directed to a conversation-sentence generation device that generates a conversation sentence of a virtual agent having a personified conversation with a user, comprising: an input unit that receives, as input information, a conversation sentence given from the user to the agent, first clue information based on which a physical and psychological state of the agent is estimated, and second clue information based on which a physical and psychological state of the user is estimated; an agent state storing unit that stores the physical and psychological state of the agent as an agent state; a user state storing unit that stores the physical and psychological state of the user as a user state; an agent state estimating unit that estimates a new agent state based on the input information and the agent state; a user state estimating unit that estimates a new user state based on the input information and the user state; an utterance intention generating unit that generates, based on the input information, the agent state, and the user state, an utterance intention directed from the agent to the user; a conversation sentence generating unit that generates, based on the input information, the agent state, the user state, and the utterance intention, a conversation sentence given from the agent to the user; and an output unit that outputs the conversation sentence generated by the conversation sentence generating unit.

According to the present invention having this configuration, generation of a conversation sentence is divided into three phases: state estimation, utterance intention generation, and conversation sentence generation. The utterance intention generation and the conversation sentence generation are separately handled so that a plurality of conversation sentences can be generated for an identical utterance intention. This method allows generation of a wide variety of conversation sentences. The agent state or the user state is estimated to estimate a physical state or psychological state of the user or agent. This method allows generation of conversation sentences suited for the estimated physical and psychological state. The results of the state estimation are stored in the state storing unit. This method allows generation of conversation sentences consistent with contents of previous remarks with reference to the stored results of the state estimation.

The present invention is directed to a conversation-sentence generation method that generates a conversation sentence of a virtual agent having a personified conversation with a user, comprising: receiving, as input information, a conversation sentence given from the user to the agent, first clue information based on which a physical and psychological state of the agent is estimated, and second clue information based on which a physical and psychological state of the user is estimated; storing the physical and psychological state of the agent as an agent state; storing the physical and psychological state of the user as a user state; estimating a new agent state based on the input information and the agent state; estimating a new user state based on the input information and the user state; generating, based on the input information, the agent state, and the user state, an utterance intention directed from the agent to the user; generating, based on the input information, the agent state, the user state, and the utterance intention, a conversation sentence given from the agent to the user; and outputting the conversation sentence generated by the conversation sentence generating unit.

The present invention is directed to a program allowing a computer to execute: a process that receives, as input information, a conversation sentence given from a user to an agent, first clue information based on which a physical and psychological state of the agent is estimated, and second clue information based on which a physical and psychological state of the user is estimated; a process that stores the physical and psychological state of the agent as an agent state; a process that stores the physical and psychological state of the user as a user state; a process that estimates a new agent state based on the input information and the agent state; a process that estimates a new user state based on the input information and the user state; a process that generates, based on the input information, the agent state, and the user state, an utterance intention directed from the agent to the user; a conversation sentence generating process that generates, based on the input information, the agent state, the user state, and the utterance intention, a conversation sentence given from the agent to the user; and a process that outputs the conversation sentence generated by the conversation sentence generating process.

Advantageous Effects of Invention

According to the present invention, conversation sentences realizing human-like conversations are generated.

DESCRIPTION OF EMBODIMENTS

Exemplary embodiments according to the present invention are hereinafter described with reference to the drawings. The present invention relates to a system which handles a machine or an animal as a personified agent, and realizes a conversation between the machine or animal and a human corresponding to a user.

First Exemplary Embodiment

Figure 1:
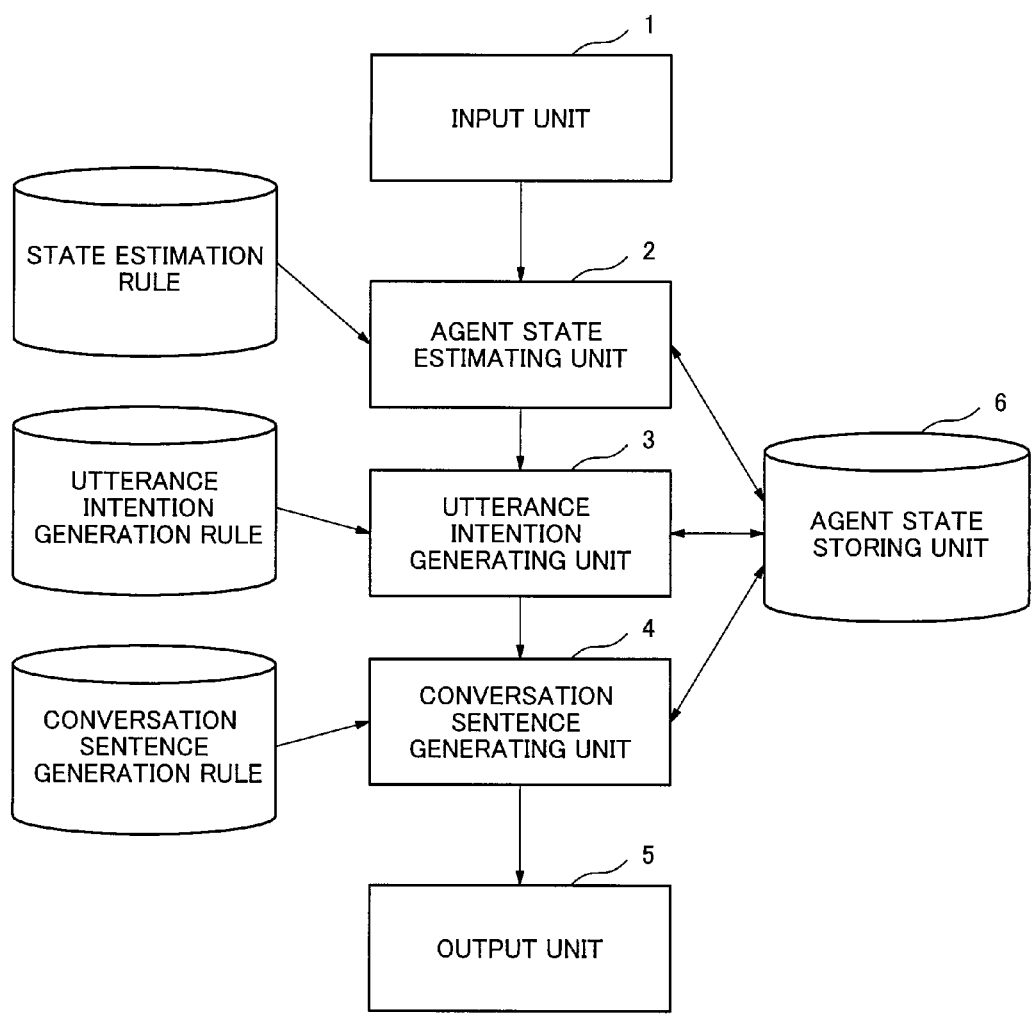
FIG. 1 is a block diagram illustrating a configuration of a first exemplary embodiment of the present invention.

FIG. 1 is a block diagram illustrating a configuration example of a conversation-sentence generation device according to a first exemplary embodiment. The device according to the first exemplary embodiment of the present invention is provided with an input unit 1, an agent state estimating unit 2, an utterance intention generating unit 3, a conversation sentence generating unit 4, an output unit 5, and an agent state storing unit 6.

The input unit 1 receives, as input information, a conversation sentence given from a user to an agent, and clue information based on which a physical and psychological state of the agent is estimated, and transmits the input information to the agent state estimating unit 2.

The input information includes a pair of attribute name and attribute value. The input information may contain the conversation sentence given from the user to the agent without change, or contain only a main point of the conversation sentence extracted based on analysis. For example, when the user transmits an email saying, "(Coming back) late" to the agent, the input information may contain only the main point of "email" as the attribute name, and "late" as the attribute value. In addition, when the agent expresses its own state and starts a conversation, the conversation sentence from the user need not be input. Other examples of the input information include attributes peculiar to the user and the agent, such as nicknames and genders of the user and the agent (hereinafter referred to as user attributes and agent attributes), and dynamic attributes such as time and weather at the time of generation of the conversation sentence (hereinafter referred to as dynamic attributes). Table 1, Table 2, and Table 3 show examples of the input information.

TABLE 1

EXAMPLE OF USER ATTRIBUTES

| ATTRIBUTE NAME | ATTRIBUTE VALUE |
|---|---|
| NICKNAME | MAMMY |
| GENDER | FEMALE |

TABLE 2

EXAMPLE OF AGENT ATTRIBUTES

| ATTRIBUTE NAME | ATTRIBUTE VALUE |
|---|---|
| NICKNAME | KORO |
| GENDER | MALE |

TABLE 3

EXAMPLE OF DYNAMIC ATTRIBUTES

| ATTRIBUTE NAME | ATTRIBUTE VALUE |
|---|---|
| EMAIL | LATE |
| TIME ZONE | EVENING |

The agent state estimating unit 2 estimates a new agent state based on the input information received from the input unit 1, and an agent state stored in the agent state storing unit 6. The agent state estimating unit 2 stores the estimated agent state in the agent state storing unit 6, and transmits the input information to the utterance intention generating unit 3.

The agent state represents a physical and psychological state of the agent, and is expressed by the pair of attribute name and attribute value similarly to the input information. For example, an "emotion value" representing an emotion of the agent using a numerical value indicates the "emotion value" as a positive value when the agent is happy or having fun. On the other hand, the "emotion value" becomes a negative value when the agent is sad or in pain. In both cases, the intensity of the emotion is defined by the absolute value of each emotion value.

The agent state is estimated based on a state estimation rule. The state estimation rule is constituted by a condition part and a state description part. The state description part describes a physical and psychological state of the agent. The condition part describes a condition set for determining whether or not the agent is in the state described in the state description part based on the input information and the agent state stored in the agent state storing unit 6. When the input information and the agent state match with the condition part, it is estimated that the agent is in the agent state described in the state description part. Table 4 shows an example of the state estimation rule.

TABLE 4

EXAMPLE OF STATE ESTIMATION RULE (A STATE: AGENT STATE, U STATE: USER STATE)

| CONDITION PART | STATE DESCRIPTION PART |
|---|---|
| DYNAMIC ATTRIBUTE -> EMAIL = LATE | A STATE -> EMOTION VALUE = −1 |
| DYNAMIC ATTRIBUTE -> EMAIL = OVERTIME WORK | U STATE -> POSITIVE-NEGATIVE STATE = NEGATIVE |

The utterance intention generating unit 3 generates an utterance intention directed from the agent to the user based on the input information received from the agent state estimating unit 2 and the agent state, and transmits the generated utterance intention and the input information to the conversation sentence generating unit 4. The utterance intention is defined by a label such as "loneliness expression" and "user comfort", and a score indicating the intensity of the intention. The utterance intention generating unit 3 generates one or a plurality of utterance intentions per generation of a conversation sentence.

The utterance intention is generated based on an utterance intention generation rule. The utterance intention generation rule is constituted by a condition part and an utterance intention description part. The utterance intention description part describes an utterance intention directed from the agent to the user. The condition part describes a condition set for determining whether or not the agent is in the utterance intention described in the utterance intention description part based on the input information, the agent state and a user state. When the input information and the agent state match with the condition part, the utterance intention described in the utterance intention description part is generated. The score of the utterance intention is the sum of the scores given to the condition part. In case of an utterance intention generated immediately after a state change, it is considered that the intensity of the intention concerning the state after the change is high. In this case, a bonus point may be given to the score of the condition associated with the state after the change to raise the score of the corresponding intention when the utterance intension is generated within a threshold period from the state change.

TABLE 5

EXAMPLE OF UTTERANCE INTENTION GENERATION RULE (A STATE: AGENT STATE, U STATE: USER STATE)

| CONDITION PART | UTTERANCE INTENTION DESCRIPTION PART |
|---|---|
| U STATE -> POSITIVE-NEGATIVE STATE = NEGATIVE (SCORE: 1.0) | USER COMFORT |
| A STATE -> EMOTION = LONELY (SCORE: 2.0) | LONELINESS EXPRESSION |

The conversation sentence generating unit 4 generates a conversation sentence given from the agent to the user based on the input information received from the utterance intention generating unit 3, the agent state, and the utterance intension, and transmits the generated conversation sentence to the output unit 5.

The conversation sentence is generated based on a conversation sentence generation rule. The conversation sentence generation rule is constituted by a condition part and a conversation sentence description part. The conversation sentence description part describes a conversation sentence given from the agent to the user. The condition part describes a condition set for determining whether or not the conversation sentence described in the conversation sentence description part is appropriate for a conversation sentence to be given from the agent to the user based on the input information, the agent state, and the utterance intention. When the input information, the agent state, and the utterance intention match with the condition part, a conversation sentence described in the conversation sentence description part is selected. The conversation sentence may be a sentence without change, or described in template format where values of the user attributes, the agent attributes and the like are contained as variables. In the latter case, the variable parts are converted into values of the user attributes, the agent attributes and the like at the time of generation of the conversation sentence so that a sentence containing the user name and the agent name can be generated.

Generation of a conversation sentence is conducted for each utterance intention so that one sentence can be produced from each utterance intention. When a plurality of conversation sentence generation rules match with one utterance intention, scores are summed for each of the condition parts similarly to the case of intention generation, and the rule having the largest total score is adopted as the conversation sentence generation rule. When a template recently selected is continuously used, the user becomes bored with the same response produced based on the same template. Accordingly, continuous selection of the same rule may be avoided by imposing a penalty on the score of the rule used within a threshold period from the previous use.

TABLE 6

EXAMPLE OF CONVERSATION SENTENCE GENERATION RULE

| CONDITION PART | CONVERSATION SENTENCE DESCRIPTION PART |
|---|---|
| UTTERANCE INTENTION = USER COMFORT (SCORE: 1.0) U STATE -> SITUATION = DURING OVERTIME WORK (SCORE: 1.0) | GOOD LUCK WITH YOUR HARD OVERTIME WORK! |
| UTTERANCE INTENTION = USER COMFORT (SCORE: 1.0) | [A ATTRIBUTE -> NICKNAME] IS ON YOUR SIDE, [U ATTRIBUTE -> NICKNAME]. |

The output unit 5 outputs, to the user, the conversation sentence received from the conversation sentence generating unit 4. For example, the output unit 5 edits character colors and sizes of the conversation sentence, and transmits an email containing the conversation sentence, or contributes the conversation sentence to SNS (social networking service). Alternatively, the output unit 5 may present the conversation sentence to the user in voices using a voice synthesizer.

The agent state storing unit 6 stores the agent state estimated by the agent state estimating unit 2 in association with the time of generation. In case of no change in association with state estimation, the agent state storing unit 6 retains the agent state at the time of previous generation of a conversation sentence so as to allow generation of a conversation sentence consistent with the previous conversation sentence.

TABLE 7

EXAMPLE OF CONTENTS OF STATE STORING UNIT
(PREVIOUS STATE CONTINUES IN NO-CHANGE PART)

| TIME | U STATE -><br>POSITIVE-NEGATIVE<br>STATE | A STATE -><br>EMOTION | A STATE -><br>EMOTION VALUE |
|---|---|---|---|
| 1 | NEGATIVE | LONELY | −1 |
| 2 | POSITIVE | LONELY | −1 |
| 3 | POSITIVE | HAPPY | +2 |
| . | | | |
| . | | | |
| . | | | |

Second Exemplary Embodiment

Figure 2:
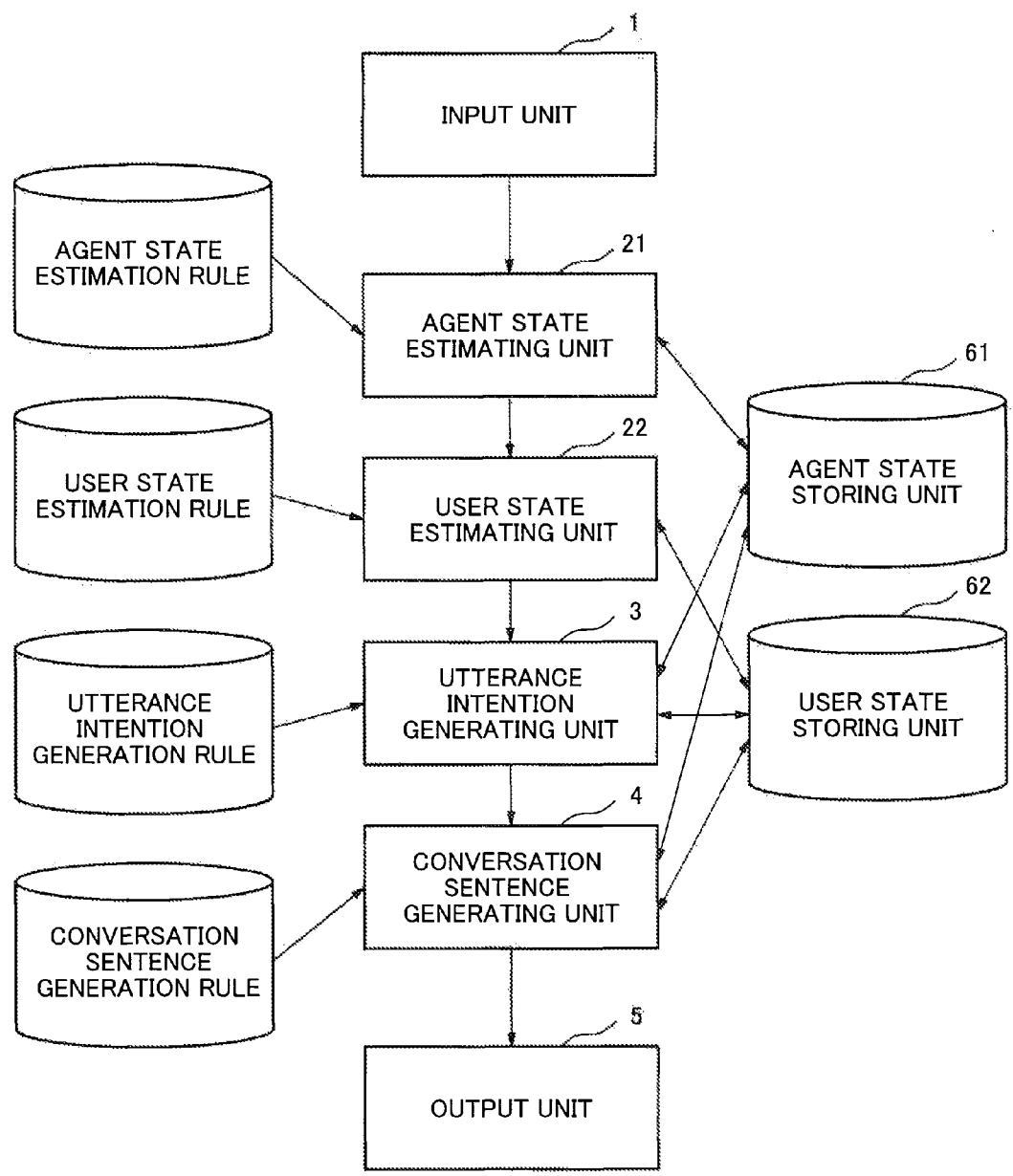
FIG. 2 is a block diagram illustrating a configuration of a second exemplary embodiment of the present invention.

FIG. 2 is a block diagram illustrating a configuration example of a conversation-sentence generation device according to a second exemplary embodiment. In the second exemplary embodiment of the present invention, a user state is estimated as well as an agent state. For realizing estimation of the user state in the second exemplary embodiment, a user state estimating unit 22 and a user state storing unit 62 are further added to the configuration illustrated in FIG. 1. The estimation and use of the user state are achieved in a manner similar to the method of the estimation and use of the agent state.

The user state represents a physical and psychological state of the user. Examples of the user state include a "positive-negative state" having a "positive" attribute value or a "negative" attribute value. The "positive-negative state" expresses a mental state of the user by two values of a "positive" value and a "negative" value based on the contents of an email given from the user or the like.

Figure 3:
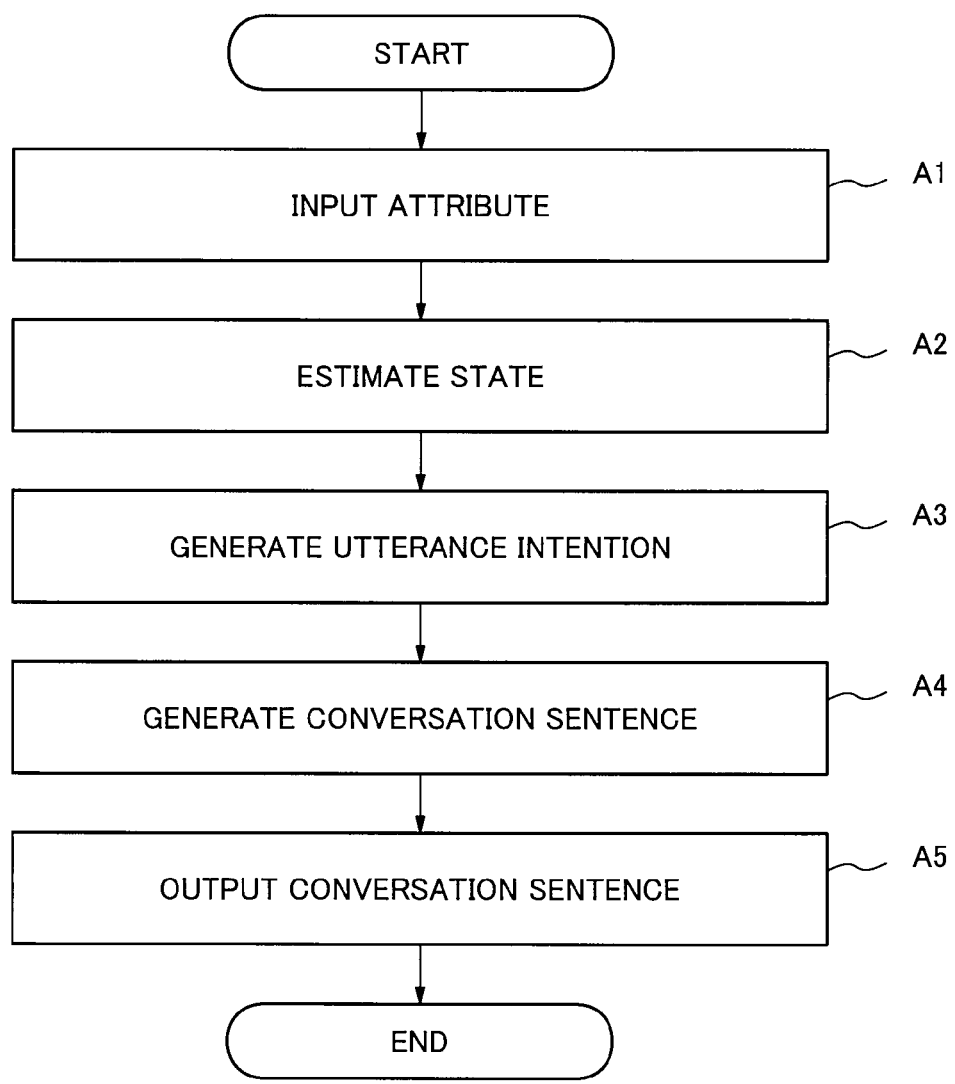
FIG. 3 is a flowchart describing operation of the exemplary embodiments of the present invention.

Operation executed according to the first and second exemplary embodiments is hereinafter described in detail with reference to a flowchart shown in FIG. 3. Initially, the input unit 1 receives, as input information, a conversation sentence given from the user to the agent, and clue information based on which the physical and psychological state of the agent is estimated (Step A1).

Then, the agent state estimating unit 2, or an agent state estimating unit 21 and the user state estimating unit 22, estimate a new agent state and a new user state based on the input information received from the input unit 1, and agent state stored in the agent state storing unit 6, or in an agent state storing unit 61 and the user state storing unit 62, and store the estimated agent state and user state in the agent state storing unit 6, or in the agent state storing unit 61 and the user state storing unit 62 (step A2).

Subsequently, the utterance intention generating unit 3 generates an utterance intention directed from the agent to the user based on the input information, the agent state, and the user state received from the agent state estimating unit 2 (step A3).

Thereafter, the conversation sentence generating unit 4 generates a conversation sentence given from the agent to the user based on the input information, the agent state, and the utterance intention received from the utterance intention generating unit 3 (step A4).

Finally, the output unit 5 outputs the conversation sentence (step A5), and ends processes.

Advantageous effects of the exemplary embodiments are hereinafter described. According to the exemplary embodiments, the utterance intention generating unit generates an utterance intention, and the conversation sentence generating unit generates a conversation sentence corresponding to the generated utterance intention. In this case, variations of conversation sentences to be generated increase when a plurality of conversation sentence generation rules are prepared for one utterance intention. In addition, the agent state estimating unit and the user state estimating unit estimate physical and psychological states of the agent and the user, and generate a conversation sentence in correspondence with the estimation. Accordingly, the conversation thus realized contains an emotion of the agent, or reflects a mental state of the user. Furthermore, the conversation sentence to be generated becomes consistent with contents of previous remarks with reference to results of the state estimation stored in the state storing unit.

Described hereinafter are specific examples of operation according to the best mode for carrying out the present invention. Discussed in these examples is a conversation system which realizes a conversation with a dog kept as a pet and corresponding to the agent.

Example 1

Discussed herein is generation of a conversation sentence when user attributes, agent attributes, and dynamic attributes shown in Table 11, Table 12, and Table 13 are given as input. Initially, the agent state estimating unit 2 estimates a "situation" of the agent state as "house sitting", and an "emotion" of the agent state as "lonely" based on input of a dynamic attribute "email=late" with reference to an agent state estimation rule shown in Table 14.

Then, the utterance intention generating unit 3 generates an utterance intension of "loneliness expression" for house sitting with reference to an utterance intention generation rule shown in Table 15, based on the agent state of "emotion=lonely" determined by the agent state estimating unit 2.

Subsequently, the conversation sentence generating unit 4 selects three types of templates shown in Table 16, and generates three types of conversation sentences, with reference to a conversation sentence generation rule shown in Table 16 which indicates a condition match of "utterance intention=loneliness expression" and "situation=house sitting". In an actual situation, only one conversation sentence is selected, wherefore one of the three conversation sentences is randomly or sequentially generated to realize a wide variety of conversations not boring for the user.

According to this example, three patterns of the conversation sentence generation rule are prepared. However, when the number of the patterns to be prepared increases, the frequency of use of the same template lowers, in which condition variations of conversations further increase.

TABLE 11

EXAMPLE OF USER ATTRIBUTES

| ATTRIBUTE NAME | ATTRIBUTE VALUE |
|---|---|
| NICKNAME | MAMMY |
| GENDER | FEMALE |

TABLE 12

EXAMPLE OF AGENT ATTRIBUTES

| ATTRIBUTE NAME | ATTRIBUTE VALUE |
|---|---|
| NICKNAME | KORO |
| GENDER | MALE |

TABLE 13

EXAMPLE OF DYNAMIC ATTRIBUTES

| ATTRIBUTE NAME | ATTRIBUTE VALUE |
|---|---|
| EMAIL | LATE |
| TIME ZONE | EVENING |

TABLE 14

EXAMPLE OF AGENT STATE ESTIMATION RULE
(A STATE: AGENT STATE, U STATE: USER STATE)

| CONDITION | ESTIMATION RESULT |
|---|---|
| DYNAMIC ATTRIBUTE -> EMAIL = LATE | A STATE -> SITUATION = HOUSE SITTING<br>A STATE -> EMOTION = LONELY |

TABLE 15

EXAMPLE OF UTTERANCE INTENTION GENERATION RULE (A STATE: AGENT STATE, U STATE: USER STATE)

| CONDITION | INTENTION |
|---|---|
| A STATE -> EMOTION = LONELY (SCORE: 4.0) | LONELINESS EXPRESSION |

TABLE 16

EXAMPLE OF CONVERSATION SENTENCE GENERATION RULE

| CONDITION | TEMPLATE |
|---|---|
| UTTERANCE INTENTION = LONELINESS EXPRESSION (SCORE: 4.0) A STATE -> SITUATION = HOUSE SITTING | [A ATTRIBUTE -> NICKNAME] FEELS LONELY AT HOME ALONE, o(;Δ;)o BOO-HOO!<br>YOU ARE LATE, (iД i) OH NO! [A ATTRIBUTE -> NICKNAME]'S LONELY HEART IS BROKEN! (p_q) WAH! YOU ARE LATE!<br>SO LONELY WITH TEARS IN [A ATTRIBUTE -> NICKNAME]'S EYES! (T_T) |

Example 2

Discussed herein is generation of a conversation sentence when user attributes, agent attributes, and dynamic attributes shown in Table 21, Table 22, and Table 23 are given as input.

Initially, the agent state estimating unit 2 estimates a "situation" of the agent state as "house sitting", and an "emotion value" as "−1" based on input of a dynamic attribute "email=late" with reference to an agent state estimation rule shown in Table 24. When the emotion value of the agent state is a "positive value (0 or larger)", it is determined that the emotion of the agent is medium to good. In this case, the emotion of the agent state is estimated as "lonely". When the emotion value of the agent state is a "negative value (−1 or smaller)", it is determined that the emotion of the agent is bad. In this case, the emotion of the agent state is estimated as "hate".

Then, the utterance intention generating unit 3 generates an utterance intention based on the "emotion" of the agent state with reference to an utterance intention generation rule shown in Table 25. The utterance intention generating unit 3 generates an utterance intention as "loneliness expression" when "emotion=lonely", and generates an utterance intention as "hate expression" when "emotion=hate".

Subsequently, the conversation sentence generating unit 4 generates a sentence expressing "lonely feeling" when "loneliness expression", and a sentence expressing "hate feeling" when "hate expression", based on definition of templates matching with utterance intentions. With reference to a conversation sentence generation rule shown in Table 26, a sentence "I feel lonely at home alone, o(;_;)o boo-hoo, from Koro" is generated when "utterance intention=loneliness expression", or a sentence "I hate house sitting!" is generated when "utterance intention=hate expression".

According to this example, the conversation sentence to be generated is varied based on the "emotion value" defined as the state of the agent, so that the agent, which is not a human, can converse as if it had human-like emotion.

TABLE 21

EXAMPLE OF USER ATTRIBUTES

| ATTRIBUTE NAME | ATTRIBUTE VALUE |
|---|---|
| NICKNAME | MAMMY |
| GENDER | FEMALE |

TABLE 22

EXAMPLE OF AGENT ATTRIBUTES

| ATTRIBUTE NAME | ATTRIBUTE VALUE |
|---|---|
| NICKNAME | KORO |
| GENDER | MALE |

TABLE 23

EXAMPLE OF DYNAMIC ATTRIBUTES

| ATTRIBUTE NAME | ATTRIBUTE VALUE |
|---|---|
| EMAIL | LATE |
| TIME ZONE | EVENING |

TABLE 24

EXAMPLE OF AGENT STATE ESTIMATION RULE (A STATE: AGENT STATE, U STATE: USER STATE)

| CONDITION | | ESTIMATION RESULT |
|---|---|---|
| DYNAMIC ATTRIBUTE -> EMAIL = | LATE | A STATE -> SITUATION = HOUSE SITTING A STATE -> EMOTION VALUE = −1 |
| A STATE -> EMOTION VALUE = | 0 OR LARGER | A STATE -> EMOTION = LONELY |
| | −1 OR SMALLER | A STATE -> EMOTION = HATE |

TABLE 25

EXAMPLE OF UTTERANCE INTENTION GENERATION RULE (A STATE: AGENT STATE, U STATE: USER STATE)

| CONDITION | | INTENTION |
|---|---|---|
| A STATE -> EMOTION = | LONELY (SCORE: 4.0) | LONELINESS EXPRESSION |
| | HATE (SCORE: 4.0) | HATE EXPRESSION |

TABLE 26

EXAMPLE OF CONVERSATION SENTENCE GENERATION RULE

| CONDITION | TEMPLATE |
|---|---|
| UTTERANCE INTENTION = LONELINESS EXPRESSION (SCORE: 4.0) A STATE -> SITUATION = HOUSE SITTING | [A ATTRIBUTE -> NICKNAME] FEELS LONELY AT HOME ALONE, o(;_;)o BOO-HOO! |
| UTTERANCE INTENTION = HATE EXPRESSION (SCORE: 4.0) A STATE -> SITUATION = HOUSE SITTING | I HATE HOUSE SITTING! |

Example 3

Discussed herein is generation of a conversation sentence when user attributes, agent attributes, and dynamic attributes shown in Table 31, Table 32, and Table 33 are given as input.

Initially, the agent state estimating unit 21 estimates a situation of the agent state as "house sitting", and an emotion value as "−1" based on input of a dynamic attribute "email=late" with reference to an agent state estimation rule shown in Table 341. When the emotion value of the agent state is a "positive value (0 or larger)", it is determined that the emotion of the agent is medium to good. In this case, the emotion of the agent state is estimated as "lonely". When the emotion value of the agent state is a "negative value (−1 or smaller)", it is determined that the emotion of the agent is bad. In this case, the emotion of the agent state is estimated as "hate".

In addition, the user state estimating unit 22 estimates that a mental state of the user is negative based on input of a dynamic attribute "user situation=during overtime work" which indicates the current situation of the user (during overtime work) with reference to a user state estimation rule shown in Table 342. In this case, a positive-negative state of the user state is estimated as "negative". On the other hand, when the situation of the user is estimated as a positive mental state for the user (such as dating and playing), the positive-negative state of the user state is estimated as "positive".

Subsequently, the utterance intention generating unit 3 generates an utterance intention based on the emotion of the agent state and the positive-negative state of the user state with reference to an utterance intention generation rule shown in Table 35.

The utterance intention generating unit 3 generates an utterance intention "loneliness expression" when the agent state is "emotion=lonely", and generates an utterance intention "hate expression" when the agent state is "emotion=hate". In addition, the utterance intention generating unit 3 generates an utterance intention "user comfort" to comfort the user in a negative mental state when the user state is "positive-negative state=negative", and generates an utterance intention "user's joy sympathy" to share joy with the user in a positive mental state when the user state is "positive-negative state=positive".

Thereafter, the conversation sentence generating unit 4 generates a conversation sentence corresponding to each conversation intention with reference to a conversation sentence generation rule shown in Table 36.

For example, the following conversation sentence is generated when there are given "loneliness expression" and "user comfort" as the utterance intention, "situation=house sitting" and "emotion=lonely" as the agent state, and "situation=during overtime work" as the user state.

KORO FEELS LONELY AT HOME ALONE, o(;Δ;)o BOO-HOO!

BUT MAMMY IS WORKING OVERTIME HARD, SO KORO WILL TRY MY BEST TO OVERCOME THIS HARD TIME, MAMMY!

According to this example, a conversation sentence to be generated is varied based on the definition of the states of the user such as "positive-negative state", wherefore generation of a conversation sentence expressed in a way expected by the user is allowed.

TABLE 31

EXAMPLE OF USER ATTRIBUTES

| ATTRIBUTE NAME | ATTRIBUTE VALUE |
|---|---|
| NICKNAME | MAMMY |
| GENDER | FEMALE |

TABLE 32

EXAMPLE OF AGENT ATTRIBUTES

| ATTRIBUTE NAME | ATTRIBUTE VALUE |
|---|---|
| NICKNAME | KORO |
| GENDER | MALE |

TABLE 33

EXAMPLE OF DYNAMIC ATTRIBUTES

| ATTRIBUTE NAME | ATTRIBUTE VALUE |
|---|---|
| EMAIL | LATE |
| USER SITUATION | DURING OVERTIME WORK |
| TIME ZONE | EVENING |

TABLE 341

EXAMPLE OF AGENT STATE ESTIMATION RULE
(A STATE: AGENT STATE)

| CONDITION | | ESTIMATION RESULT |
|---|---|---|
| DYNAMIC ATTRIBUTE -> EMAIL = | LATE | A STATE -> SITUATION = HOUSE SITTING |
| A STATE -> EMOTION VALUE = | 0 OR LARGER | A STATE -> EMOTION VALUE = -1 A STATE -> EMOTION = LONELY |
| | -1 OR SMALLER | A STATE -> EMOTION = HATE |

TABLE 342

EXAMPLE OF USER STATE ESTIMATION RULE (U STATE: USER STATE)

| CONDITION | | ESTIMATION RESULT |
|---|---|---|
| DYNAMIC ATTRIBUTE -> USER | DURING OVERTIME WORK | U STATE -> POSITIVE-NEGATIVE STATE = NEGATIVE U STATE -> SITUATION = DURING |

TABLE 342-continued

EXAMPLE OF USER STATE ESTIMATION RULE (U STATE: USER STATE)

| CONDITION | | ESTIMATION RESULT |
|---|---|---|
| SITUATION | DATING | OVERTIME WORK U STATE -> POSITIVE-NEGATIVE STATE = POSITIVE U STATE -> SITUATION = DATING |

TABLE 35

EXAMPLE OF UTTERANCE INTENTION GENERATION RULE (A STATE: AGENT STATE, U STATE: USER STATE)

| CONDITION | | INTENTION |
|---|---|---|
| A STATE -> EMOTION = | LONELY (SCORE: 4.0) | LONELINESS EXPRESSION |
| | HATE (SCORE: 4.0) | HATE EXPRESSION |
| U STATE -> POSITIVE- NEGATIVE STATE | NEGATIVE (SCORE: 2.0) POSITIVE (SCORE: 2.0) | USER COMFORT USER'S JOY SYMPATHY |

TABLE 36

EXAMPLE OF CONVERSATION SENTENCE GENERATION RULE

| CONDITION | TEMPLATE |
|---|---|
| (LONELINESS EXPRESSION + USER COMFORT) | |
| UTTERANCE INTENTION = LONELINESS EXPRESSION (SCORE 4.0) A STATE -> SITUATION = HOUSE SITTING UTTERANCE INTENTION = USER COMFORT (SCORE: 2.0) U STATE -> SITUATION = DURING OVERTIME WORK A STATE -> EMOTION = LONELY | [A ATTRIBUTE -> NICKNAME] FEELS LONELY AT HOME ALONE, o(;Δ;)o BOO-HOO! BUT YOU ARE WORKING OVERTIME HARD, SO [A ATTRIBUTE -> NICKNAME] WILL TRY MY BEST TO OVERCOME THIS HARD TIME, [U ATTRIBUTE -> NICKNAME]! |
| (HATE EXPRESSION + USER COMFORT) | |
| UTTERANCE INTENTION = HATE EXPRESSION (SCORE: 4.0) A STATE -> SITUATION = HOUSE SITTING UTTERANCE INTENTION = USER COMFORT (SCORE: 4.0) U STATE -> SITUATION = DURING OVERTIME WORK A STATE -> EMOTION = HATE | I HATE HOUSE SITTING! BUT YOU ARE ALWAYS WORKING HARD FOR [A ATTRIBUTE -> NICKNAME], [U ATTRIBUTE -> NICKNAME]. [A ATTRIBUTE -> NICKNAME] WILL PUT UP WITH THIS HARD TIME. DON'T WORK TOO HARD ＼(@^V^@)／ |
| (LONELINESS EXPRESSION + USER'S JOY SYMPATHY) | |
| UTTERANCE INTENTION = LONELINESS EXPRESSION (SCORE: 4.0) A STATE -> SITUATION = HOUSE SITTING UTTERANCE INTENTION = USER'S JOY SYMPATHY (SCORE: 2.0) U STATE -> SITUATION = DATING A STATE -> EMOTION = LONELY | [A ATTRIBUTE -> NICKNAME] FEEL LONELY AT HOME ALONE, o(;Δ;)o BOO-HOO! BUT I'M HAPPY TO HEAR THAT, [U ATTRIBUTE -> NICKNAME]. [A ATTRIBUTE -> NICKNAME] WILL PUT UP WITH THIS HARD TIME FOR [U ATTRIBUTE -> NICKNAME]'S HAPPINESS! |
| (HATE EXPRESSION + USER'S JOY SYMPATHY) | |
| UTTERANCE INTENTION = HATE EXPRESSION (SCORE: 4.0) A STATE -> SITUATION = HOUSE SITTING | I HATE HOUSE SITTING! |

TABLE 36-continued

EXAMPLE OF CONVERSATION SENTENCE GENERATION RULE

| CONDITION | TEMPLATE |
|---|---|
| UTTERANCE INTENTION = USER'S JOY SYMPATHY (SCORE: 2.0) U STATE -> SITUATION = DATING A STATE -> EMOTION = HATE | OOHH! (-.-;) BUT [A ATTRIBUTE -> NICKNAME] WILL PUT UP WITH THIS HARD TIME FOR YOUR HAPPINESS, [U ATTRIBUTE -> NICKNAME]! |

Example 4

Discussed herein is generation of a conversation sentence when user attributes, agent attributes, and dynamic attributes shown in Table 41, Table 42, and Table 43 are given as input. This example shows a conversation between a plurality of users and the agent, as well as a one-to-one conversation between the user and the agent.

Initially, the agent state estimating unit 21 and the user state estimating unit 22 generate a situation of the agent state as "waiting for souvenir", an emotion value as "+1", and a degree of intimacy of the user state as "+1" based on input of a dynamic attribute as "souvenir=food" from a user P1 with reference to an agent state estimation rule and a user state estimation rule shown in Table 44. When the emotion value of the user state is "threshold or larger (−2 or larger)", it is determined that the relation between the agent and the user is medium to good. In this case, the emotion of the agent state "very happy" is generated. When the emotion value of the user state is "threshold or smaller (−3 or smaller)", it is determined that the relation between the agent and the user is bad. In this case, the emotion of the agent state "happy" is generated.

On the other hand, the agent state estimating unit 21 and the user state estimating unit 22 generate a situation of the agent state as "commuting to hospital", an emotion value as "−2", and a degree of intimacy of the user state as "−2" based on input of a dynamic attribute "email=going to hospital" given from a user P2. When the emotion value of the user state is "threshold or larger (−2 or larger)", it is determined that the relationship between the agent and the user is medium to good. In this case, the emotion of the agent state "sad" is generated. When the emotion value of the user state is "threshold or smaller (−3 or smaller)", it is determined that the relationship between the agent and the user is bad. In this case, the emotion of the agent state "hate" is generated.

Then, the utterance intention generating unit 3 generates an utterance intention based on the agent state and the user state with reference to an utterance intention generation rule shown in Table 45. In case of the user P1, the utterance intention generating unit 3 generates an utterance intention "delight expression" when "emotion=very happy", and generates an utterance intention "joy expression" when "emotion=happy". In case of the user P2, the utterance intention generating unit 3 generates an utterance intention "sadness expression" when "emotion=sad", and generates an utterance intention "hate expression" when "emotion=hate".

Subsequently, the conversation sentence generating unit 4 generates a conversation sentence corresponding to each conversation intention while considering the degree of intimacy between the user and the agent as conversation targets with reference to a conversation sentence generation rule shown in Table 46.

For example, for a user exhibiting a low degree of intimacy as a result of repetitive negative actions for the agent, the sentence is defined as a stiff and formal response even when a positive dynamic attribute ("souvenir=food") is given. On the other hand, for a user exhibiting a high degree of intimacy as a result of repetitive positive actions for the agent, the sentence is defined as a response matching with the emotion of the agent, i.e., such a response as to fawn on the user even when a negative dynamic attribute is given, both with a wide variety of templates so as to make responses matching with the emotion of the agent.

As noted above, the degrees of intimacy between the respective users and the agent are defined by numerical values based on emotions of the agent produced through exchanges between the respective users and the agent. The degree of intimacy is raised when a dynamic attribute positive for the agent is given, and lowered when a dynamic attribute negative for the agent is given. These degrees of intimacy are stored and managed for each user. In this case, an emotion of the agent to be produced is variable between a user exhibiting a high degree of intimacy and a user exhibiting a low degree of intimacy even when the same dynamic attribute is given. Accordingly, a response given to each user reflects the degree of intimacy of the corresponding user.

TABLE 41

EXAMPLE OF USER ATTRIBUTES

| ATTRIBUTE NAME | ATTRIBUTE VALUE |
|---|---|
| (USER P1) | |
| NICKNAME | MAMMY |
| GENDER | FEMALE |
| (USER P2) | |
| NICKNAME | HIRO-KUN |
| GENDER | MALE |

TABLE 42

EXAMPLE OF AGENT ATTRIBUTES

| ATTRIBUTE NAME | ATTRIBUTE VALUE |
|---|---|
| NICKNAME | KORO |
| GENDER | MALE |

TABLE 43

EXAMPLE OF DYNAMIC ATTRIBUTES

| ATTRIBUTE NAME | ATTRIBUTE VALUE |
|---|---|
| (DYNAMIC ATTRIBUTES OF USER P1) | |
| SOUVENIR | FOOD |
| (DYNAMIC ATTRIBUTES OF USER P2) | |
| EMAIL | GOING TO HOSPITAL |

TABLE 44

EXAMPLE OF AGENT STATE ESTIMATION RULE AND USER STATE ESTIMATION RULE (A STATE: AGENT STATE, U STATE: USER STATE)

| CONDITION | ESTIMATION RESULT |
|---|---|
| DYNAMIC ATTRIBUTE -> SOUVENIR = FOOD | A STATE -> SITUATION = WAITING FOR SOUVENIR<br>A STATE -> EMOTION VALUE += 1<br>U STATE -> DEGREE OF INTIMACY += 1 |
| DYNAMIC ATTRIBUTE -> SOUVENIR = FOOD<br>U STATE -> DEGREE OF INTIMACY ≥ −2 | A STATE -> EMOTION = VERY HAPPY |
| DYNAMIC ATTRIBUTE -> SOUVENIR = FOOD<br>U STATE -> DEGREE OF INTIMACY ≤ −3 | A STATE -> EMOTION = HAPPY |
| DYNAMIC ATTRIBUTE -> EMAIL = GOING TO HOSPITAL | A STATE -> SITUATION = COMMUTING TO HOSPITAL<br>A STATE -> EMOTION VALUE −= 2<br>U STATE -> DEGREE OF INTIMACY −= 2 |
| DYNAMIC ATTRIBUTE -> EMAIL = GOING TO HOSPITAL<br>U STATE -> DEGREE OF INTIMACY ≥ −2 | A STATE -> EMOTION = SAD |
| DYNAMIC ATTRIBUTE -> EMAIL = GOING TO HOSPITAL<br>U STATE -> DEGREE OF INTIMACY ≤ −3 | A STATE -> EMOTION = HATE |

TABLE 45

EXAMPLE OF UTTERANCE INTENTION GENERATION RULE (A STATE: AGENT STATE, U STATE: USER STATE)

| CONDITION | | INTENTION |
|---|---|---|
| A STATE -> EMOTION = | VERY HAPPY (SCORE: 4.0) | DELIGHT EXPRESSION |
| | HAPPY (SCORE: 4.0) | JOY EXPRESSION |
| | SAD (SCORE: 4.0) | SADNESS EXPRESSION |
| | HATE (SCORE: 4.0) | HATE EXPRESSION |

TABLE 46

EXAMPLE OF CONVERSATION SENTENCE GENERATION RULE

| CONDITION | TEMPLATE |
|---|---|
| (JOY EXPRESSION) | |
| UTTERANCE INTENTION = DELIGHT EXPRESSION (SCORE: 4.0)<br>U STATE -> DEGREE OF INTIMACY ≥ −2 | YEAH! I'VE GOT SOUVENIR! THANK YOU VERY VERY MUCH! ♪ (*^_^*)v |
| UTTERANCE INTENTION = JOY EXPRESSION (SCORE: 4.0)<br>U STATE -> DEGREE OF INTIMACY ≤ −3 | THANK YOU FOR YOUR SOUVENIR. |
| (SADNESS EXPRESSION, HATE EXPRESSION) | |
| UTTERANCE INTENTION = SADNESS EXPRESSION (SCORE: 4.0)<br>A STATE -> SITUATION = COMMUTING TO HOSPITAL<br>U STATE -> INTIMACY ≥ −2 | BOO-HOO! (;_;) I DON'T WANT TO GO TO HOSPITAL. [U ATTRIBUTE -> NICKANE], PLEASE DON'T TAKE ME THERE! |
| UTTERANCE INTENTION = HATE EXPRESSION (SCORE: 4.0)<br>A STATE -> SITUATION = COMMUTING TO HOSPITAL<br>U STATE -> INTIMACY ≤ −3 | YOU'RE MEAN, [U ATTRIBUTE -> NICKANE]! I WON'T GO TO HOSPITAL! |

Example 5

Discussed herein is an example of generation of a conversation sentence when user attributes, agent attributes, dynamic attributes shown in Table 51, Table 52, and Table 53 are given as input. This example shows generation of a conversation consistent with flow of a previous conversation.

It is assumed as a situation that the agent is hungry at a time of input 1, and fully fed at input 2. It is assumed under this situation that input 3 or input 4 is given.

Initially, the agent state estimating unit 21 and the user state estimating unit 22 generate a situation of the agent state as "house sitting", an emotion value as "−1", and an emotion as "lonely" based on input of a dynamic attribute "email=late" at input 1.

On the other hand, the agent state estimating unit 21 and the user state estimating unit 22 generate a positive-negative state of the user state as "positive" based on input of a dynamic attribute "user situation=dating". In addition, the agent state estimating unit 21 and the user state estimating unit 22 generate a physical condition of the agent state as "hungry" based on determination that the agent is hungry as a result of the situation of late return and delay of a meal.

At input 2, the agent state estimating unit 21 and the user state estimating unit 22 generate a situation of the agent state as "after meal", an emotion value as "+1", an emotion as "happy", and a physical condition as "fully fed" based on input of a dynamic attribute "meal=everything eaten".

At input 3 and input 4, the emotion of the agent state changes to "happy" as a result of input of a dynamic attribute "souvenir=food". However, no dynamic attribute for changing the physical condition is present, wherefore the state of input 2 "physical condition=fully fed" continues. In this stage, there is no difference between input 3 and input 4.

The utterance intention generating unit 3 determines an utterance intention based on the current agent state and the agent state continuing from the past.

At input 1, the utterance intention generating unit 3 generates "loneliness expression" for house sitting based on the agent state "emotion=lonely", and "hunger expression" based on "physical condition=hungry". In addition, the utterance intention generating unit 3 generates "user's joy sympathy" based on the user state "positive-negative state=positive".

At input 2, the utterance intention generating unit 3 generates "joy expression" based on the agent state "emotion=happy", and generates "fully fed state expression" based on the agent state "physical condition=fully fed".

At input 3 and input 4, the utterance intention generating unit 3 generates "joy expression" based on the agent state "emotion=happy", and generates "fully fed state expression" based on the agent state "physical condition=fully fed". In this stage, there is still no difference between input 3 and input 4.

The conversation sentence generating unit 4 defines such a conversation sentence generation rule as to touch upon previous contents with reference to history information on a dynamic attribute, an agent state, and a user state at a previous time.

At input 3, a sentence corresponding to the current agent state (fully fed) is generated without referring to history information. However, at input 4, the sentence to be generated is defined as a response consistent with the fact that the agent was "hungry" with reference to history information at a certain previous time designated by a dynamic attribute, as information indicating the agent state (hungry) at the previous time. At input 4, "(input 1)" corresponding to a "history pointer" is given as a dynamic attribute, so that the agent state at the time of input 1 stored in the agent state storing unit 61 can be referred to based on this information. At the time of reference, the "physical condition" of the agent state at the previous time of input 1 is referred to based on such a description as "history: A state→physical condition".

Accordingly, generation of a conversation sentence consistent with the past is allowed based on a rule utilizing previous results of state estimation.

TABLE 51

EXAMPLE OF USER ATTRIBUTES

| ATTRIBUTE NAME | ATTRIBUTE VALUE |
|---|---|
| NICKNAME | MAMMY |
| GENDER | FEMALE |

TABLE 52

EXAMPLE OF AGENT ATTRIBUTES

| ATTRIBUTE NAME | ATTRIBUTE VALUE |
|---|---|
| NICKNAME | KORO |
| GENDER | MALE |

TABLE 53

EXAMPLE OF DYNAMIC ATTRIBUTES

| ATTRIBUTE NAME | ATTRIBUTE VALUE |
|---|---|
| (INPUT 1) | |
| EMAIL | LATE |
| USER SITUATION | DATING |
| TIME ZONE | EVENING |
| (INPUT 2) | |
| MEAL | EVERYTHING EATEN |
| USER SITUATION | HOME |
| TIME ZONE | NIGHT |
| (INPUT 3) | |
| SOUVENIR | FOOD |
| USER SITUATION | COMING HOME |
| TIME ZONE | NIGHT |
| (INPUT 4) | |
| SOUVENIR | FOOD |
| HISTORY POINTER | (INPUT 1) |
| USER SITUATION | COMING HOME |
| TIME ZONE | NIGHT |

TABLE 54

EXAMPLE OF STATE ESTIMATION RULE (A STATE: AGENT STATE, U STATE: USER STATE)

| CONDITION | ESTIMATION RESULT |
|---|---|
| (INPUT 1) | |
| DYNAMIC ATTRIBUTE -> EMAIL = LATE | A STATE -> SITUATION = HOUSE SITTING<br>A STATE -> EMOTION VALUE = −1<br>A STATE -> EMOTION = LONELY |

TABLE 54-continued

EXAMPLE OF STATE ESTIMATION RULE (A STATE: AGENT STATE, U STATE: USER STATE)

| CONDITION | | ESTIMATION RESULT |
|---|---|---|
| DYNAMIC ATTRIBUTE -> USER SITUATION | DATING | A STATE -> PHYSICAL CONDITION = HUNGRY<br>U STATE -> POSITIVE-NEGATIVE STATE = POSITIVE<br>U STATE -> SITUATION = DATING |
| (INPUT 2) | | |
| DYNAMIC ATTRIBUTE -> MEAL = | EVERYTHING EATEN | A STATE -> SITUATION = AFTER MEAL<br>A STATE -> EMOTION VALUE = +1<br>A STATE -> EMOTION = HAPPY<br>A STATE -> PHYSICAL CONDITION = FULLY FED |
| (INPUT 3, 4) | | |
| DYNAMIC ATTRIBUTE -> SOUVENIR = | FOOD | A STATE -> SITUATION = WAITING FOR SOUVENIR<br>A STATE -> EMOTION = HAPPY<br>A STATE -> EMOTION VALUE = +1 |

TABLE 55

EXAMPLE OF UTTERANCE INTENTION GENERATION RULE (A STATE: AGENT STATE, U STATE: USER STATE)

| CONDITION | | INTENTION |
|---|---|---|
| (INPUT 1) | | |
| A STATE -> EMOTION =<br>A STATE -> PHYSICAL CONDITION =<br>U STATE -> POSITIVE-NEGATIVE STATE = | LONELY (SCORE: 4.0)<br>HUNGRY (SCORE: 2.0)<br>POSITIVE (SCORE: 2.0) | LONELINESS EXPRESSION<br>HUNGER EXPRESSION<br>USER'S JOY SYMPATHY |
| (INPUT 2) | | |
| A STATE -> EMOTION =<br>A STATE -> PHYSICAL CONDITION = | HAPPY (SCORE: 4.0)<br>FULLY FED (SCORE: 2.0) | JOY EXPRESSION<br>FULLY FED STATE EXPRESSION |
| (INPUT 3) | | |
| A STATE -> EMOTION =<br>A STATE-> PHYSICAL CONDITION = | HAPPY (SCORE: 4.0)<br>FULLY FED (SCORE: 2.0) | JOY EXPRESSION<br>FULLY FED STATE EXPRESSION |

TABLE 56

EXAMPLE OF CONVERSATION SENTENCE GENERATION RULE

| CONDITION | TEMPLATE |
|---|---|
| (INPUT 1) | |
| UTTERANCE INTENTION = LONELINESS EXPRESSION (SCORE: 4.0)<br>A STATE -> SITUATION = HOUSE SITTING | YOU ARE LATE!<br>SO LONELY WITH TEARS IN [A ATTRIBUTE -> NICKNAME]'S EYES! (T_T) |
| UTTERANCE INTENTION = HUNGER EXPRESSION (SCORE: 4.0) | HUNGRY! HUNGRY! |
| UTTERANCE INTENTION = USER'S JOY SYMPATHY (SCORE: 4.0) | PHEW! (-.-;)<br>IT'S HARD, BUT [A ATTRIBUTE -> NICKNAME] WISHES YOU HAPPINESS! MAMMY |
| (INPUT 2) | |
| UTTERANCE INTENTION = JOY EXPRESSION (SCORE: 4.0)<br>A STATE -> SITUATION = AFTER MEAL | I'M FULL! |

TABLE 56-continued

EXAMPLE OF CONVERSATION SENTENCE GENERATION RULE

| CONDITION | TEMPLATE |
|---|---|
| UTTERANCE INTENTION = FULLY FED STATE EXPRESSION (SCORE: 2.0) | SATISFIED! I CAN'T EAT ANY MORE! |
| (INPUT 3) GIVE FOOD WITHOUT CONSIDERATION OF SITUATION AT INPUT 1 | |
| UTTERANCE INTENTION = JOY EXPRESSION (SCORE: 4.0) A STATE -> SITUATION = WAITING FOR SOUVENIR | SOUVENIR? THANKS! |
| UTTERANCE INTENTION = FULLY FED STATE EXPRESSION (SCORE: 2.0) | OH! (ﾟ_ﾟ;) I'M COMPLETELY FULL NOW. WILL I GET FAT IF I EAT SOUVENIR, TOO? (NERVOUS) |
| (INPUT 4) GIVE FOOD TO AGENT WHICH WAS HUNGRY AT INPUT 1 | |
| UTTERANCE INTENTION = JOY EXPRESSION (SCORE: 4.0) A STATE -> SITUATION = WAITING FOR SOUVENIR | SOUVENIR ♪ SOUVENIR ♪ THANKS ♪ |
| UTTERANCE INTENTION = FULLY FED STATE EXPRESSION (SCORE: 2.0) HISTORY: A STATE -> PHYSICAL CONDITION = HUNGRY | WELL, [A ATTRIBUTE -> NICKNAME] WAS HUNGRY JUST BEFORE, BUT I'M FULL NOW. EVEN SO, THERE'S ALWAYS ROOM FOR SNACK! I'LL TRY! |

The state estimation rule, the utterance intention generation rule, and the conversation sentence generation rule may be stored in a storing unit of the conversation-sentence generation device, for example, or another device to which the conversation-sentence generation device is connectable.

The present invention is applicable to a conversation system, a social media service and the like which personify a non-human target such as an animal and a machine and realize a conversation between a user and the personified target.

The conversation-sentence generation device according to the exemplary embodiment of the present invention described herein may be practiced in the form of an operation program or the like which is stored in a storing unit and read by a CPU (Central Processing Unit) to be executed, or may be constituted in the form of hardware. Alternatively, only a part of the functions discussed in the foregoing exemplary embodiment may be practiced under a computer program.

A part or the whole of the foregoing exemplary embodiment may be described as in the following supplemental notes, but is not limited to these supplemental notes.

(Supplemental Note 1)

A conversation-sentence generation device that generates a conversation sentence of a virtual agent having a personified conversation with a user, including:

an input unit that receives, as input information, a conversation sentence given from the user to the agent, first clue information based on which a physical and psychological state of the agent is estimated, and second clue information based on which a physical and psychological state of the user is estimated;

an agent state storing unit that stores the physical and psychological state of the agent as an agent state;

a user state storing unit that stores the physical and psychological state of the user as a user state;

an agent state estimating unit that estimates a new agent state based on the input information and the agent state;

a user state estimating unit that estimates a new user state based on the input information and the user state;

an utterance intention generating unit that generates, based on the input information, the agent state, and the user state, an utterance intention directed from the agent to the user;

a conversation sentence generating unit that generates, based on the input information, the agent state, the user state, and the utterance intention, a conversation sentence given from the agent to the user; and an output unit that outputs the conversation sentence generated by the conversation sentence generating unit.

(Supplemental Note 2)

The conversation-sentence generation device according to Supplemental Note 1, wherein the user state estimating unit estimates a new user state based on a state estimation rule that contains a state description part describing the physical and psychological state of the user, and a condition part describing a condition set for determining whether or not the user is in the state described in the state description part with reference to the input information and the user state stored in the user state storing unit.

(Supplemental Note 3)

The conversation-sentence generation device according to Supplemental Notes 1 or 2, wherein the utterance intention generating unit generates an utterance intention based on an utterance intention generation rule that contains a condition including the user state, and the conversation sentence generating unit generates a conversation sentence based on a conversation sentence generation rule that contains a condition including the user state to generate a conversation sentence corresponding to the user state.

(Supplemental Note 4)

The conversation-sentence generation device according to any one of Notes 1 to 3, wherein in a conversion with a plurality of users, the user state storing unit stores user states of the respective users, each of the user states being peculiar to the corresponding user, and the conversation sentence generating unit switches the user states based on information input from the input unit to designate the target users in the conversation so as to generate a conversation sentence appropriate for each of the target users.

(Supplemental Note 5)

A conversation-sentence generation method that generates a conversation sentence of a virtual agent having a personified conversation with a user, comprising:

receiving, as input information, a conversation sentence given from the user to the agent, first clue information based on which a physical and psychological state of the agent is estimated, and second clue information based on which a physical and psychological state of the user is estimated;

storing the physical and psychological state of the agent as an agent state;

storing the physical and psychological state of the user as a user state;

estimating a new agent state based on the input information and the agent state;

estimating a new user state based on the input information and the user state;

generating, based on the input information, the agent state, and the user state, an utterance intention directed from the agent to the user;

generating, based on the input information, the agent state, the user state, and the utterance intention, a conversation sentence given from the agent to the user; and outputting the generated conversation sentence.

(Supplemental Note 6)

The conversation-sentence generation method according to Supplemental Note 5, wherein estimating a new user state based on a state estimation rule that contains a state description part describing the physical and psychological state of the user, and a condition part describing a condition set for determining whether or not the user is in the state described in the state description part with reference to the input information and the stored user state.

(Supplemental Note 7)

The conversation-sentence generation method according to Supplemental Notes 5 or 6, wherein generating an utterance intention based on an utterance intention generation rule that contains a condition including the user state, and generating a conversation sentence based on a conversation sentence generation rule that contains a condition including the user state to generate a conversation sentence corresponding to the user state.

(Supplemental Note 8)

The conversation-sentence generation method according to any one of Notes 5 to 7, wherein storing user states of respective users, each of the user states being peculiar to the corresponding user, in a conversion with a plurality of users, and switching the user states based on the information input to designate the target users in the conversation so as to generate a conversation sentence appropriate for each of the target users.

(Supplemental Note 9)

A program allowing a computer to execute:

an input process that receives, as input information, a conversation sentence given from the user to the agent, first clue information based on which a physical and psychological state of the agent is estimated, and second clue information based on which a physical and psychological state of the user is estimated;

a process that stores the physical and psychological state of the agent as an agent state;

a user state storing process that stores the physical and psychological state of the user as a user state;

a process that estimates a new agent state based on the input information and the agent state;

a user state estimating process that estimates a new user state based on the input information and the user state;

an utterance intention generating process that generates, based on the input information, the agent state, and the user state, an utterance intention directed from the agent to the user;

a conversation sentence generating process that generates, based on the input information, the agent state, the user state, and the utterance intention, a conversation sentence given from the agent to the user; and a process that outputs the conversation sentence generated by the conversation sentence generating process.

(Supplemental Note 10)

The program according to Supplemental Note 9, wherein the user state estimating process estimates a new user state based on a state estimation rule that contains a state description part describing the physical and psychological state of the user, and a condition part describing a condition set for determining whether or not the user is in the state described in the state description part with reference to the input information and the stored user state.

(Supplemental Note 11)

The program according to Supplemental Notes 9 or 10, wherein the utterance intention generating process generates an utterance intention based on an utterance intention generation rule that contains a condition including the user state, and the conversation sentence generating process generates a conversation sentence based on a conversation sentence generation rule that contains a condition including the user state to generate a conversation sentence corresponding to the user state.

(Supplemental Note 12)

The program according to any one of Notes 9 to 11, wherein in a conversion with a plurality of users, the user state storing process stores user states of the respective users, each of the user states being peculiar to the corresponding user, and the conversation sentence generating process switches the user states based on information input from the input process to designate the target users in the conversation so as to generate a conversation sentence appropriate for each of the target users.

While a preferred exemplary embodiment according to the present invention has been described, the present invention is not necessarily limited to the foregoing exemplary embodiment. Various modifications may be made without departing from the scope of the technical spirit of the present invention.

This application claims priority to Japanese Patent Application No. 2012-246262, filed Nov. 8, 2012, the entirety of which is hereby incorporated by reference.

1 Input unit
2 Agent state estimating unit
3 Utterance intention generating unit
4 Conversation sentence generating unit
5 Output unit
6 Agent state storing unit
21 Agent state estimating unit
22 User state estimating unit
61 Agent state storing unit
62 User state storing unit

What is claimed is:

1. A conversation-sentence generation device that generates a conversation sentence of a virtual agent having a personified conversation with each of a plurality of users, comprising:
a memory that stores a physical and psychological state of the agent as an agent state and stores a physical and psychological state of each of the plurality of users respectively as a user state, the agent state including an emotion value representing an emotion of the agent, and the user state including a degree of intimacy value representing a degree of intimacy between each of the plurality of users and the agent; and
a processor configured to execute instructions to implement:
an input unit that receives, as input information, a conversation sentence given from one of the plurality of users to the agent, first clue information based on which the physical and psychological state of the agent is estimated, and second clue information based on which the physical and psychological state of the one of the plurality of users is estimated;
an agent state estimating unit that estimates a new agent state based on the input information and the agent state, the agent state estimating unit further estimating the emotion value of the agent state;
a user state estimating unit that estimates a new user state based on the input information and the user state;
an utterance intention generating unit that determines whether said one of the plurality of users is an opponent user based on the input information, and that generates an utterance intention directed from the agent to the opponent user based on the input information, the agent state including the emotion value, and the user state;
a conversation sentence generating unit that generates, based on the input information, the agent state, the user state of the opponent user including the degree of intimacy between the agent and the opponent user, and the utterance intention, a conversation sentence given from the agent to the opponent user; and
an output unit that outputs the conversation sentence generated by the conversation sentence generating unit.

2. The conversation-sentence generation device according to claim 1, wherein
the user state estimating unit estimates a new user state based on a state estimation rule that contains a state description part describing the physical and psychological state of the user, and a condition part describing a condition set for determining whether or not each of the plurality of users is in the state described in the state description part with reference to the input information and the user state stored in the user state storing unit.

3. The conversation-sentence generation device according to claim 1, wherein
the utterance intention generating unit generates an utterance intention based on an utterance intention generation rule that contains a condition including the user state, and
the conversation sentence generating unit generates a conversation sentence based on a conversation sentence generation rule that contains a condition including the user state to generate a conversation sentence corresponding to the user state.

4. The conversation-sentence generation device according to claim 1, wherein
the user state for each of the plurality of users includes positive-negative state, the user state estimating unit further estimates the positive-negative state of the user state of the opponent user, and the utterance intention generating unit generates the utterance intention based on the psychological state of the agent state and the positive-negative state of the user state of the opponent user.

5. The conversation-sentence generation device according to claim 1, wherein
a first score is attached to the utterance intention, a bonus point is given to the first score of the utterance intention when the utterance intension is generated within a threshold time period from a change of the agent state or the user state of the opponent user, and the utterance intention generating unit generates the utterance intention in accordance with the first score.

6. The conversation-sentence generation device according to claim 1, wherein
a second score is attached to the conversation sentence, a penalty on the second score is imposed when the conversation sentence used within a threshold time period, and the conversation sentence generating unit generates the conversation sentence using the second score.

7. The conversation-sentence generation device according to claim 1, wherein
the memory stores history of the agent state for each of the plurality of the users, and the conversation sentence generating unit generates the conversation sentence by using the history of the agent state for the opponent user stored in the memory.

8. A conversation-sentence generation method that generates a conversation sentence of a virtual agent having a personified conversation with each of a plurality of users, comprising:
receiving, as input information, a conversation sentence given from one of the plurality of users to the agent, first clue information based on which a physical and psychological state of the agent is estimated, and second clue information based on which a physical and psychological state of the one of the plurality of users is estimated;
storing the physical and psychological state of the agent as an agent state, wherein
the agent state includes an emotion value representing an emotion of the agent, and the user state includes a degree of intimacy value representing a degree of intimacy between each of the plurality of users and the agent;
storing the physical and psychological state of each of the plurality of users respectively as a user state;
estimating a new agent state based on the input information and the agent state;
estimating the emotion value of the agent state;
estimating a new user state based on the input information and the user state;
determining, based on the input information, whether said one of the plurality of users is an opponent user;
generating, based on the input information, the agent state including the emotion value, and the user state, an utterance intention directed from the agent to the opponent user;
generating, based on the input information, the agent state, the user state of the opponent user including the degree of intimacy between the agent and the opponent user, and the utterance intention, a conversation sentence given from the agent to the opponent user; and
outputting the generated conversation sentence.

9. A non-transitory computer-readable storage medium storing a program causing a computer to execute:
- a process that receives, as input information, a conversation sentence given from one of a plurality of users to a virtual agent, first clue information based on which a physical and psychological state of the agent is estimated, and second clue information based on which a physical and psychological state of the one of the plurality of users is estimated;
- a process that stores the physical and psychological state of the agent as an agent state, wherein the agent state includes an emotion value representing an emotion of the agent, and the user state includes a degree of intimacy value representing a degree of intimacy between each of the plurality of users and the agent;
- a process that stores the physical and psychological state of the each of the plurality of users respectively as a user state;
- a process that estimates a new agent state based on the input information and the agent state;
- a process that estimates the emotion value of the agent state;
- a process that estimates a new user state based on the input information and the user state;
- a process that determines, based on the input information, whether said one of the plurality of users is an opponent user;
- a process that generates, based on the input information, the agent state including the emotion value, and the user state, an utterance intention directed from the agent to the opponent user;
- a conversation sentence generating process that generates, based on the input information, the agent state, the user state of the opponent user including the degree of intimacy between the agent and the opponent user, and the utterance intention, a conversation sentence given from the agent to the opponent user; and
- a process that outputs the conversation sentence generated by the conversation sentence generating process.

* * * * *